United States Patent
Richter

(10) Patent No.: US 9,304,013 B2
(45) Date of Patent: Apr. 5, 2016

(54) STORAGE DEVICE AND NAVIGATION SYSTEM

(71) Applicant: Bayerische Motoren Werke Aktiengesellschaft, Munich (DE)

(72) Inventor: Werner Richter, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/310,875

(22) Filed: Jun. 20, 2014

(65) Prior Publication Data

US 2014/0303889 A1 Oct. 9, 2014

Related U.S. Application Data

(63) Continuation of application No. PCT/EP2012/073024, filed on Nov. 20, 2012.

(30) Foreign Application Priority Data

Dec. 21, 2011 (DE) .......................... 10 2011 089 355

(51) Int. Cl.
*G01C 21/00* (2006.01)
*G01C 21/34* (2006.01)
*G01C 21/36* (2006.01)
*G06F 17/30* (2006.01)
*G09B 29/10* (2006.01)
*G01C 21/26* (2006.01)

(52) U.S. Cl.
CPC ............ *G01C 21/3682* (2013.01); *G01C 21/26* (2013.01); *G09B 29/106* (2013.01); *G01C 21/00* (2013.01); *G01C 21/34* (2013.01); *G01C 21/3446* (2013.01); *G01C 21/3476* (2013.01)

(58) Field of Classification Search
None
See application file for complete search history.

(56) References Cited

U.S. PATENT DOCUMENTS

| | | | |
|---|---|---|---|
| 6,434,482 B1 | 8/2002 | Oshida et al. | |
| 7,437,238 B2 | 10/2008 | Monde et al. | |
| 8,406,999 B2 | 3/2013 | Koyasu et al. | |
| 8,810,437 B2 * | 8/2014 | Beyeler et al. | ............. 340/995.1 |
| 2007/0244632 A1 * | 10/2007 | Mueller | ............. G01C 21/3446 701/533 |
| 2012/0123678 A1 * | 5/2012 | Poppen et al. | ................ 701/468 |
| 2012/0310465 A1 * | 12/2012 | Boatright et al. | ............... 701/25 |

FOREIGN PATENT DOCUMENTS

| | | |
|---|---|---|
| DE | 10 2004 009 872 A1 | 9/2004 |
| DE | 11 2009 001 358 T5 | 9/2011 |

(Continued)

OTHER PUBLICATIONS

German Search Report dated Apr. 3, 2012, including English translation (ten (10) pages).

(Continued)

*Primary Examiner* — Jerrah Edwards
*Assistant Examiner* — Demetra Smith-Stewart
(74) *Attorney, Agent, or Firm* — Crowell & Moring LLP

(57) ABSTRACT

A storage device is configured such that a multiplicity of location information objects, which in each case represent a location, is stored, and that a distance information object, which in each case represents the distance by road from the location of a location information object to the freeway exit closest to the location, is stored in association with the location information objects in each case. A navigation system is provided with the storage device.

9 Claims, 1 Drawing Sheet

(56) References Cited

FOREIGN PATENT DOCUMENTS

| EP | 0 419 248 A2 | 3/1991 |
| EP | 1 936 519 A1 | 9/2006 |

OTHER PUBLICATIONS

International Search Report dated Feb. 4, 2013 with English translation (five (5) pages).

\* cited by examiner

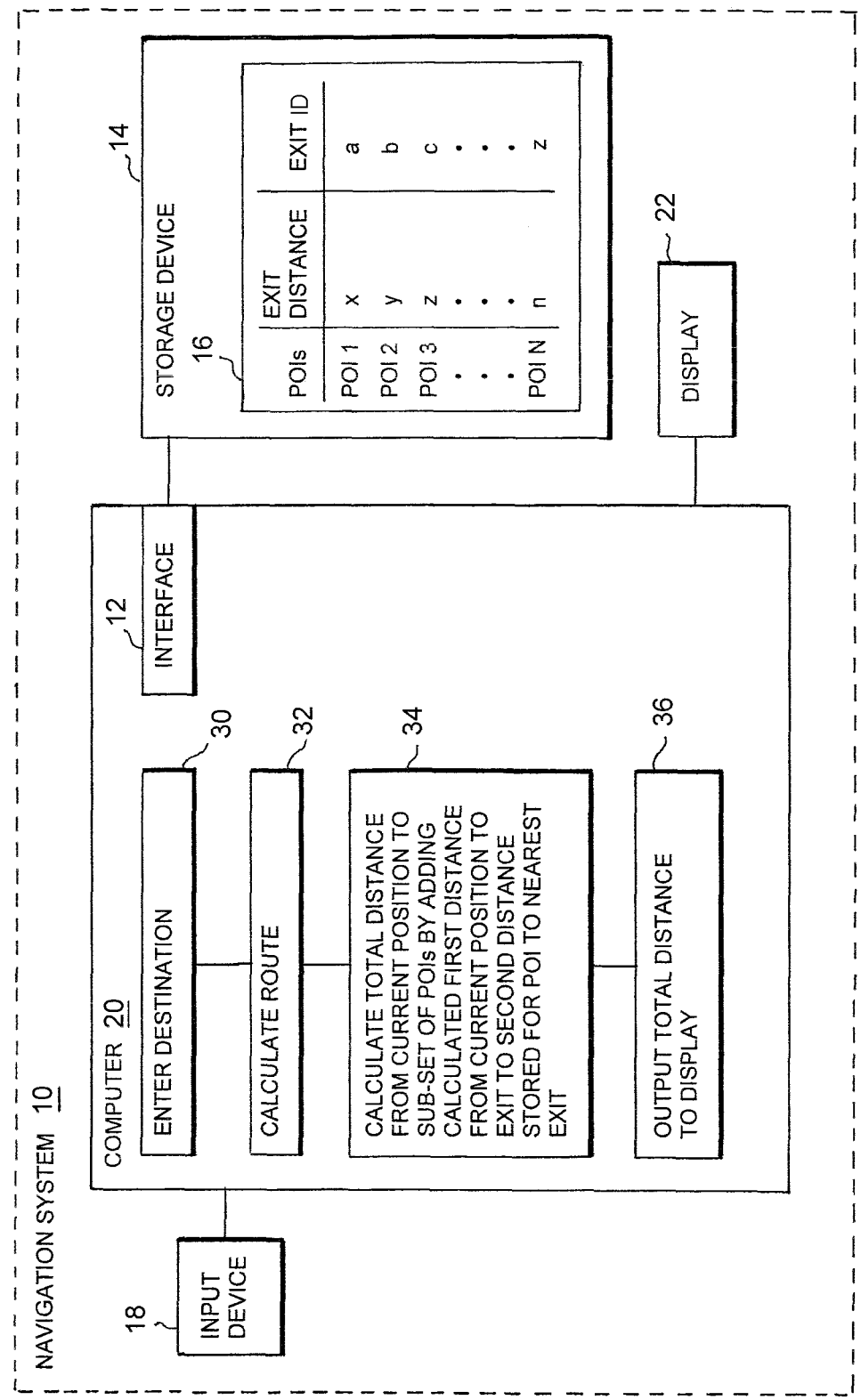

STORAGE DEVICE AND NAVIGATION SYSTEM

CROSS REFERENCE TO RELATED APPLICATIONS

This application is a continuation of PCT International Application No. PCT/EP2012/073024, filed Nov. 20, 2012, which claims priority under 35 U.S.C. §119 from German Patent Application No. 10 2011 089 355.5, filed Dec. 21, 2011, the entire disclosures of which are herein expressly incorporated by reference.

BACKGROUND AND SUMMARY OF THE INVENTION

The invention relates to a storage device and a navigation system.

With navigation systems, it is possible to calculate routes between a starting point and a destination point based on an electronic road map according to various criteria. For this purpose, it is proposed to assign cost values (for example travel time, travel distance, energy consumption, etc. or any combinations based thereon) to individual, digitized road sections (so-called "links") and to determine a route with low or minimal overall costs.

So-called Points of Interest (POIs) often form part of the electronic road map or other storage devices which can be connected to communicate with the navigation system. These location information objects usually include the name of a defined location, if appropriate a brief description of the location, and the geographical coordinates of the location.

It is known to display POIs which lie in the vicinity of the current location or in the vicinity of the current route during the journey by means of a navigation system.

In doing so, it is an objective to specify, in particular display, the distance from the current location (current vehicle position or current position of the navigation system) to the POIs in each case together with the POIs. Here, the distance calculation is either based on the linear distance between current location and POI or on the road route to the POI. The first alternative is very inaccurate and the second alternative is very calculation-intensive, as current routes from the current location to all POIs to be displayed must be calculated for this purpose.

The invention is now based on the object of specifying an improved technical teaching compared with the prior art.

This and other objects are achieved by a navigation system, and associated storage device, according to the invention. The storage device is configured such that a multiplicity of location information objects, which in each case represent a location, is stored, and a distance information object, which in each case represents the distance by road from the location of a location information object to the freeway exit closest to the location, is stored in association with the location information objects in each case. The navigation system includes the storage device and has an interface for accessing the storage device, and a computer device configured such that the calculation of a total distance to a location represented by a location information object is based on the formation of a total of a first distance and a second distance. The first distance is determined by the distance by road from the current location to the freeway exit which is closest to the location represented by the location information object, and the second distance is determined by the distance information object which is stored in association with the location information object.

The invention is accordingly based on storing the distance (for example, based on linear distance, fastest road route or shortest road route) between the POI and the freeway exit which is closest to the POI (for example with regard to linear distance, fastest road route or shortest road route), together with the location information objects (POIs) in each case.

A storage device according to the invention, such as for example a hard disk or a DVD, is configured in such a way that a multiplicity of location information objects, which in each case represent a location, is stored thereon, and that a distance information object, which in each case represents the distance by road (distance to be covered, in particular, on the shortest, fastest or most efficient route) from the location of a location information object to the freeway exit closest to the location (with regard to road distance or linear distance), is stored thereon in association with the location information objects in each case. Here, the location of the freeway exit can be determined, for example, by coordinates or other parameters of a position in the vicinity of the appropriate freeway exit.

By this means, in order to calculate a total distance from a current position to a location of a location information object, it is only necessary to comparatively laboriously calculate the distance by road from the current position to the freeway exit closest to the location; the total distance is then simply given by the sum of this calculated distance by road and the distance by road associated with, in particular stored in association with, the location information object.

This enables the total distance from a current position to a location of a location information object to be determined accurately and easily, and therefore quickly and with little computer power. This is particularly advantageous when the total distances to a multiplicity of locations of different location information objects are to be determined.

Along with the distance information object, which in each case represents the distance by road from the location of a location information object to the freeway exit closest to the location, further distance information objects can be stored associated with the location information object, which in each case preferably represent the distances by road from the location of the location information object to a further freeway exit closest to the location of the location information object.

Preferably, the multiplicity of location information objects is in each case stored associated with at least one freeway exit identification (ID, name or coordinates of the freeway exit), by means of which the freeway exit which lies closest to the location of the location information object (for example, with regard to distance by road or linear distance) is determined.

Preferably, the storage device is designed as an electronic road map or includes an electronic road map, wherein geographical coordinates are in each case associated with the location information objects. This also enables routing directions to be given to the location of a location information object.

A preferred refinement provides that the location information objects in each case represent a Point of Interest (POI, location of particular interest, tourist attraction).

A navigation system according to the invention, which, for example, is designed as part of a motor vehicle or a cell phone, includes the aforementioned storage device and an interface for accessing the storage device.

A computer device, such as, for example, a program-controlled processor device, is designed or configured in such a way that the calculation of a total distance to a location represented by a location information object is based on the formation of a total of a first distance and a second distance.

The first distance is determined by the distance by road from the current location (of the navigation system) to the freeway exit which is closest to the location represented by the location information object.

The second distance is determined by the distance information object which is associated with, in particular stored in association with, the location information object.

By this means, in order to determine a total distance from a current location to a location of a location information object, it is only necessary to comparatively laboriously calculate the distance by road (first distance) from the current location to the freeway exit closest to the location, but in a manner which is known per se. However, the total distance is then simply given by the sum of this calculated distance by road and the distance by road (second distance) stored in association with the location information object.

A refinement of the invention is that the first distance is derived from the route to a driving destination which is currently determined by the navigation system and, if appropriate, is currently being followed, and which is not part of the location information object. The first distance is preferably based on a sub-route of the currently determined route. This enables the first distance to be determined with little effort.

Of course, it is also within the scope of the invention, that, as well as the distances between the locations of location information objects and freeway exits, distances between the locations of location information objects and other prominent locations, such as crossroads for example, are in each case also associated with the location information objects, and these distances are also used for calculating the total distance. It is likewise a matter of course that, as well as the stated location information objects, location information objects with which no distance information object is associated can also be provided.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a high level block diagram illustrating a navigation system and storage device according to an embodiment of the invention.

DETAILED DESCRIPTION OF THE DRAWING

A navigation system, which in general is known per se, is assumed. The navigation system 10 according to the invention has access via an interface 12 to a storage device 14 on which an electronic road map is stored. Part of the electronic road map is a list of POIs 16. As an alternative, it is possible for the list of POIs 16 to be stored on a storage device which is formed separately from the electronic road map and which the navigation system 10 or the processor device 20 of the navigation system can access via a wireless or wired communication connection.

At least one distance, which specifies the distance by road on a fastest, shortest or most efficient route from the POI to a freeway exit which is close or closest to the appropriate POI, is in each case associated with a portion of the POIs (distances, x, y, z . . . n). In addition, at least one freeway exit identification, which specifies to which freeway exit the distance relates, is in each case associated with one or the portion of the POIs, in particular with the distances of a POI (exit IDs a, b, c . . . z).

The navigation system 10 is designed in such a way that, after entering a driving destination (step 30), such as by way of an input device 18, and after or as part of the calculation of the route from the current position of the navigation system to the driving destination (step 32), the total distances from the current position to a sub-set of the POIs stored on the storage device are calculated (step 34). The sub-set is determined, for example, by the POIs whose distance (distance by road or linear distance) from the route is less than a specified limiting distance, or is determined by the POIs which lie in the geographical region of the route.

The calculation of a total distance from the current position to a POI, in particular to the location of a POI, is based on the formation of a total of a first distance and a second distance. The first distance is determined by the distance by road from the current location to the freeway exit which is closest to the location represented by the location information object and which is therefore stored in association with the POI. The second distance is determined by the above-mentioned distance which is stored in association with the POI.

After or in the course of the calculation of the total distances to the sub-set of POIs, the total distances are output individually or together, either automatically or triggered by an operator action, for example on a display 22 of the navigation system (step 36). A total distance to a POI can be automatically updated as the navigation system gets closer to the associated freeway exit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation system, comprising:
   a storage device having stored therein a plurality of location information objects, each location information object representing a location, and wherein the storage device further comprises a plurality of distance information objects stored therein, each distance information object representing a distance by road from a respective location information object, of the plurality of location information objects, to a freeway exit closest to said respective location information object, each distance information object being associated with a corresponding one of the plurality of location information objects;
   a computer operatively configured to interface with the storage device in order to access the storage device, wherein the computer is configured to calculate a total distance to a particular location information object, of the plurality of location information objects, based on a summing of a first distance and a second distance, wherein
      the first distance is calculated, by the computer, as a distance by road from a current location of the navigation system to a freeway exit closest to the particular location information object, and
      the second distance is a distance represented by a distance information object, of the plurality of distance information objects, that is stored in association with the particular location information object; and
   a display coupled to the computer and configured to present the total distance to a user of the navigation system.

2. The navigation system according to claim 1, wherein the storage device is configured as an electronic road map, geographical coordinates being, in each case, associated with the location information objects stored in the storage device.

3. The navigation system according to claim 2, wherein the location information objects each represent a point of interest.

4. The navigation system according to claim 1, wherein the location information objects each represent a point of interest.

5. The navigation system according to claim 1, wherein the first distance is derived from a route calculated by the navigation system based on a driving destination entered by the user.

6. The method according to claim 1, wherein the location information objects each represent a point of interest.

7. The method according to claim 1, further comprising deriving the first distance from a route calculated by the navigation system based on a driving destination entered by the user.

8. A method, comprising:
   storing, in a storage device of a vehicle navigation system, a plurality of location information objects, each of the plurality of location information objects representing a respective location;
   storing, in the storage device, a plurality of distance information objects each of which represent a distance by road from a corresponding one of the plurality of location information objects to a freeway exit that is closest to said corresponding one of the plurality of location information objects, each of the plurality of distance information objects being associated with a respective one of the plurality of location information objects;
   calculating, by a computer of the navigation system, a first distance by road from a current location of the navigation system to a freeway exit closest to a selected one of the plurality of location information objects;
   retrieving, by the computer, a second distance from the storage device, wherein the second distance is the respective distance represented by the distance information object stored in association with the selected one of the plurality of location information objects;
   calculating a total distance to the selected location information object based on a summing of a first distance and a second distance; and
   displaying, on a display of the navigation system operatively coupled to the computer, the total distance.

9. The method according to claim 8, wherein the storage device is configured as an electronic road map, geographical coordinates being, in each case, associated with the location information objects stored in the storage device.

\* \* \* \* \*